United States Patent
Kawasaki

(10) Patent No.: US 9,311,026 B2
(45) Date of Patent: Apr. 12, 2016

(54) INFORMATION PROCESSING APPARATUS, INFORMATION PROCESSING METHOD, AND NON-TRANSITORY COMPUTER-READABLE MEDIUM

(71) Applicant: CANON KABUSHIKI KAISHA, Tokyo (JP)

(72) Inventor: Hiromasa Kawasaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/079,770

(22) Filed: Nov. 14, 2013

(65) Prior Publication Data

US 2014/0160510 A1    Jun. 12, 2014

(30) Foreign Application Priority Data

Dec. 12, 2012  (JP) ................................. 2012-271779

(51) Int. Cl.
   *G06F 3/12*      (2006.01)
   *G06K 15/02*     (2006.01)
   *G06F 11/07*     (2006.01)
   *H04L 12/26*     (2006.01)

(52) U.S. Cl.
   CPC .............. *G06F 3/121* (2013.01); *G06F 3/1244* (2013.01); *G06F 3/1273* (2013.01); *G06F 11/0781* (2013.01); *H04L 43/0876* (2013.01)

(58) Field of Classification Search
   CPC ................................................. G06F 15/0275
   See application file for complete search history.

(56) References Cited

U.S. PATENT DOCUMENTS

| | | | | |
|---|---|---|---|---|
| 5,335,016 | A * | 8/1994 | Nakagawa ............... | 375/240.03 |
| 5,913,041 | A * | 6/1999 | Ramanathan et al. ........ | 709/233 |
| 8,514,734 | B2 * | 8/2013 | Qiu ............................... | 370/252 |
| 2003/0035142 | A1 * | 2/2003 | Kizaki ........................ | 358/1.16 |
| 2004/0218559 | A1 * | 11/2004 | Kim et al. ...................... | 370/318 |
| 2005/0046699 | A1 * | 3/2005 | Oya et al. .................... | 348/207.1 |
| 2006/0062430 | A1 * | 3/2006 | Vallone et al. ................. | 382/103 |
| 2006/0069832 | A1 * | 3/2006 | Imaizumi ....................... | 710/110 |
| 2006/0103644 | A1 * | 5/2006 | Choi .............................. | 345/214 |
| 2007/0177809 | A1 * | 8/2007 | Takahashi ..................... | 382/232 |
| 2008/0012738 | A1 * | 1/2008 | Seki et al. ....................... | 341/51 |
| 2009/0303382 | A1 * | 12/2009 | Hamada ....................... | 348/468 |
| 2010/0198964 | A1 * | 8/2010 | Tanaka .......................... | 709/224 |
| 2010/0199071 | A1 * | 8/2010 | Nakazono et al. ............. | 712/201 |
| 2011/0179316 | A1 * | 7/2011 | Geuzebroek et al. ........... | 714/48 |
| 2011/0317212 | A1 * | 12/2011 | Ueda ............................ | 358/1.15 |
| 2012/0151190 | A1 * | 6/2012 | Usuba ........................... | 712/220 |

FOREIGN PATENT DOCUMENTS

JP           9-98167 A      4/1997

* cited by examiner

*Primary Examiner* — Beniyam Menberu
(74) *Attorney, Agent, or Firm* — Fitzpatrick, Cella, Harper & Scinto

(57) ABSTRACT

An information processing apparatus comprises: a processing unit which performs a predetermined process on input data, and outputs the input data on which the predetermined process has been performed; a measurement unit configured to measure an output amount of the output data from the processing unit; a specifying unit configured to specify a period in which the predetermined process is performed by the processing unit; a determination unit configured to determine whether the output amount measured by the measurement unit in the specified period satisfies a predetermined condition; and an output unit configured to output a log associated with the predetermined process by the processing unit on the basis of the determination result.

10 Claims, 21 Drawing Sheets

F I G. 1
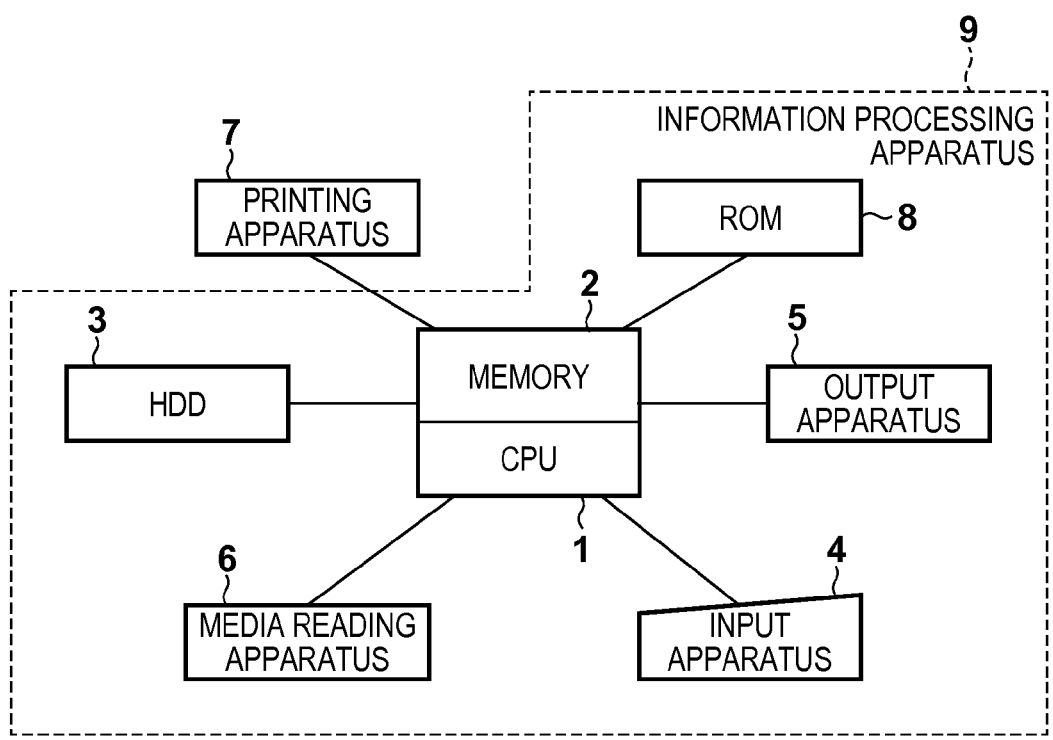

FIG. 9A

FORMAT CONVERSION LOG

```
Document PROCESSING start
    PARAMETER pagenum=100, color=black...
    page PROCESSING start
        PARAMETER height=100. width=200....
        Image PROCESSING start
            PARAMETER imagesize=256, x=100, y=1000,...
        Image PROCESSING end
        path PROCESSING start
            PARAMETER x=100. y=1000....
    page PROCESSING end
    .
    .
    .
Document PROCESSING end
```

FIG. 9B

SYSTEM LOG

```
TIME
    20xx/xx/xx 11:11
AVAILABLE MEMORY
    800M
CPU UTILIZATION RATIO
    80%
OPERATION APPLICATION
    Example1.exe CPU UTILIZATION RATIO : 2% MEMORY IN USE : 1000K
    Example2.exe CPU UTILIZATION RATIO : 0% MEMORY IN USE : 100K
    Example3.exe CPU UTILIZATION RATIO : 0% MEMORY IN USE : 80K
    Example4.exe CPU UTILIZATION RATIO : 40% MEMORY IN USE : 5000K
    Example5.exe CPU UTILIZATION RATIO : 0% MEMORY IN USE : 100K
    Example6.exe CPU UTILIZATION RATIO : 2% MEMORY IN USE : 1000K
    ...
```

FIG. 12

EXAMPLE OF COMMAND OF INPUT DATA — 121

```
...
<Path ax=0.0, ay=5.5, bx=2.1, by=3.9 color...>
<Gradation type=3 ax=9.3...>
<Path ax=10.0, ay=25.5, bx=23.1, by=33.9 color...>
<Path ax=20.0, ay=15.5, bx=21.1, by=32.9 color...>
<Image length=1002321, x=12.4, =87.2,
imagestream="0xafa 143............................">
...
```

CHECK WHETHER EXCEPTIONAL COMMAND MATCHES EXCEPTIONAL COMMAND CONDITION

EXAMPLE OF EXCEPTIONAL COMMAND CONDITION TABLE — 122

| ID | EXCEPTIONAL COMMAND CONDITION |
|----|-------------------------------|
| 1  | Gradation type=3              |
| 2  | Gradation type=4              |
| 3  | Image length >100000          |
| ...| ...                           |

US 9,311,026 B2

INFORMATION PROCESSING APPARATUS, INFORMATION PROCESSING METHOD, AND NON-TRANSITORY COMPUTER-READABLE MEDIUM

BACKGROUND OF THE INVENTION

1. Field of the Invention

The present invention relates to an information processing apparatus, an information processing method, and a non-transitory computer-readable medium and, more particularly, to a method of performing abnormality detection of data conversion processing.

2. Description of the Related Art

When receiving input data such as an electronic document or an image and performing data conversion including format conversion processing, other applications on the same PC (Personal Computer) may occupy resources such as a CPU and memory. In this case, a data conversion processing speed may deteriorate considerably or the format conversion processing may behave abnormally. If such phenomenon occurs in a server or a cloud environment, a developer or an operator needs to track down the cause from an acquired log. Although it is possible to track down the cause by outputting the log continually, the data conversion processing speed deteriorates because the resources are used to frequently collect information to be output to the log. Furthermore, the log cannot be output more than necessary when the capacity of a storage area is limited, for example, in the cloud environment.

Under these circumstances, it is necessary to collect and output the log only when detecting abnormalities. To detect abnormalities, a method of monitoring traffic and notifying only when there is a great change in the traffic (see Japanese Patent Laid-Open No. 9-98167).

In Japanese Patent Laid-Open No. 9-98167, the traffic is monitored constantly. This indicates in the case of a system in which the traffic changes drastically, abnormalities are detected every time a change occurs. That is, it is difficult to specify whether it is a change in traffic due to the occurrence of an abnormality or it is an ordinary change, and unnecessary abnormality detection increases.

SUMMARY OF THE INVENTION

According to one aspect of the present invention, there is provided an information processing apparatus comprising: a processing unit configured to perform a predetermined process on input data, and to output the input data on which the predetermined process has been performed; a measurement unit configured to measure an output amount of the output data from the processing unit; a specifying unit configured to specify a period in which the predetermined process is performed by the processing unit; a determination unit configured to determine whether the output amount measured by the measurement unit in the specified period satisfies a predetermined condition; and an output unit configured to output a log associated with the predetermined process by the processing unit on the basis of the determination result.

According to another aspect of the present invention, there is provided an information processing method comprising: performing a predetermined process on input data; outputting the input data on which the predetermined process has been performed; measuring an output amount of the output data; specifying a period in which the predetermined process is performed on the input data; determining whether the output amount measured in the specified period satisfies a predetermined condition; and outputting a log associated with the predetermined process executed for the input data in accordance with the determination result.

According to another aspect of the present invention, there is provided a non-transitory computer readable medium storing a program to cause at least one processor to execute an information processing method, the method comprising: performing a predetermined process on input data; outputting the input data on which the predetermined process has been performed; measuring an output amount of the output data; specifying a period in which the predetermined process is performed on the input data; determining whether the output amount measured in the specified period satisfies a predetermined condition; and outputting a log associated with the predetermined process executed for the input data in accordance with the determination result.

According to the present invention, an appropriate log can be output while suppressing unnecessary abnormality detection.

Further features of the present invention will become apparent from the following description of exemplary embodiments (with reference to the attached drawings).

BRIEF DESCRIPTION OF THE DRAWINGS

FIG. 1 is a block diagram showing an example of the arrangement of an information processing apparatus and a printing apparatus;

FIGS. 9A and 9B are tables showing examples of the configuration of logs;

FIG. 12 is tables for explaining examples of an exceptional command;

DESCRIPTION OF THE EMBODIMENTS

Figure 2:
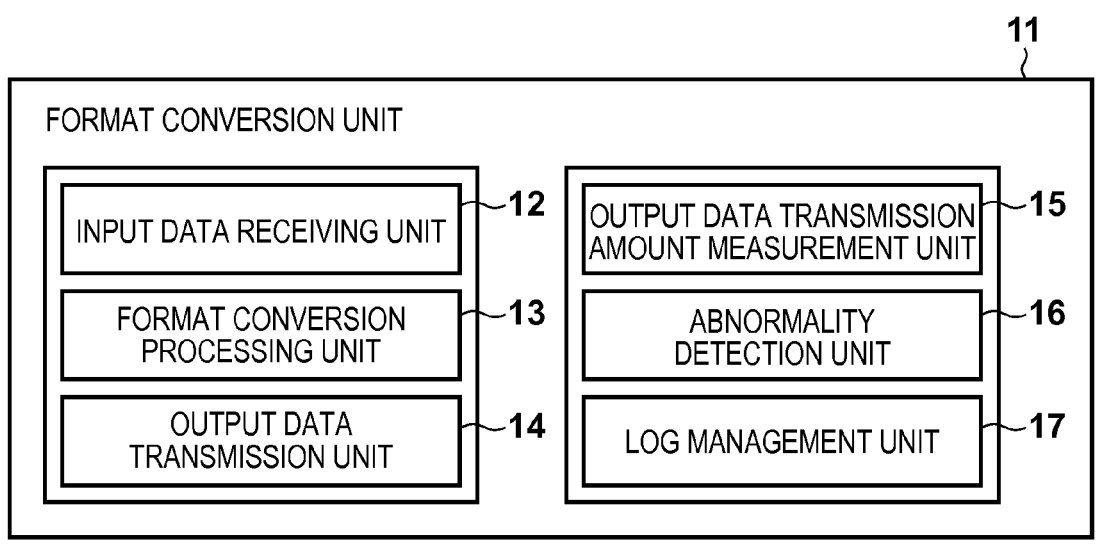
FIG. 2 is a block diagram showing an example of the arrangement of a format conversion unit.

Embodiments of the present invention will now be described with reference to the accompanying drawings.

In these embodiments, an example of applying an abnormality detection method of data conversion processing according to the present invention to, in particular, a client computer will be described. However, the abnormality detection method according to the present invention is similarly applicable to a server or cloud computing of web service. In addition, the present invention is also applicable to implementation within a printing apparatus such as a printer and a multi function peripheral. Furthermore, data conversion processing below will exemplify format conversion processing. However, other processing can be exemplified and applied to the present invention as long as it generates a log along with the execution of the processing.

<First Embodiment>
[Arrangement of Apparatus]

FIG. 1 is a block diagram showing an example of the arrangement of an information processing apparatus and a printing apparatus according to the first embodiment. An information processing apparatus 9 is a computer for outputting printing data to a printing apparatus 7. A CPU 1 executes a program stored in a program area inside a ROM 8, or a program such as an OS (Operating System) or a general application, which is loaded from an HDD 3 to a memory 2. The memory 2 functions as main memory, a work area, or the like of the CPU 1.

The HDD 3 stores a boot program, various applications, a user file, a variety of data used in an application, and the like. Also, a job to be received is sent to the HDD 3. An output apparatus 5 controls a display by a display for example. A media reading apparatus 6 controls access to various media such as a CD or a DVD. An input apparatus 4 controls a key input from a keyboard or a pointing device (not shown). The printing apparatus 7 receives information output from the information processing apparatus 9 and executes print processing. Note that the present invention is not limited even if respective apparatuses are connected via a network.

[Software Configuration]

FIG. 2 is a block diagram showing a format conversion unit 11 according to the present invention. Although the first embodiment will be described on the premise of a format conversion which converts across different formats such as an electronic document, a page description language, an image, or the like, a data conversion which converts general data such as a list of figures may be done. The format conversion unit 11, in the information processing apparatus 9, includes data which is related to a program stored in the media reading apparatus 6 or the HDD 3, and is loaded to the memory 2 and executed by the CPU 1.

The format conversion unit 11 operates under the OS to serve as an application, software service or a printer driver. Upon receiving a format conversion instruction from the input apparatus 4, the format conversion unit 11 outputs data after the format conversion processing to the HDD 3. Note that, in the first embodiment, the following description will be made assuming that the converted data is saved in the HDD 3. However, output data may be sequentially transmitted to the printing apparatus 7 without being saved in the HDD 3 or output in an area reserved on the memory 2.

An input data receiving unit 12 receives input data to be performed format conversion. A format conversion processing unit 13 performs the format conversion for the input data received by the input data receiving unit 12. An output data transmission unit 14 saves the data after the format conversion in the HDD 3. At this time, the output data transmission unit 14 appropriately transmits output data processed by the format conversion processing unit 13 to the HDD 3, which is an output destination. An output data transmission amount measurement unit 15 measures output data transmitted by the output data transmission unit 14 every unit time. An abnormality detection unit 16 detects abnormalities based on the value of the output data amount measured by the output data transmission amount measurement unit 15. When the abnormality detection unit 16 detects abnormalities, a log management unit 17 outputs a log. The log output here is held in, for example, the HDD 3.

Figure 3:
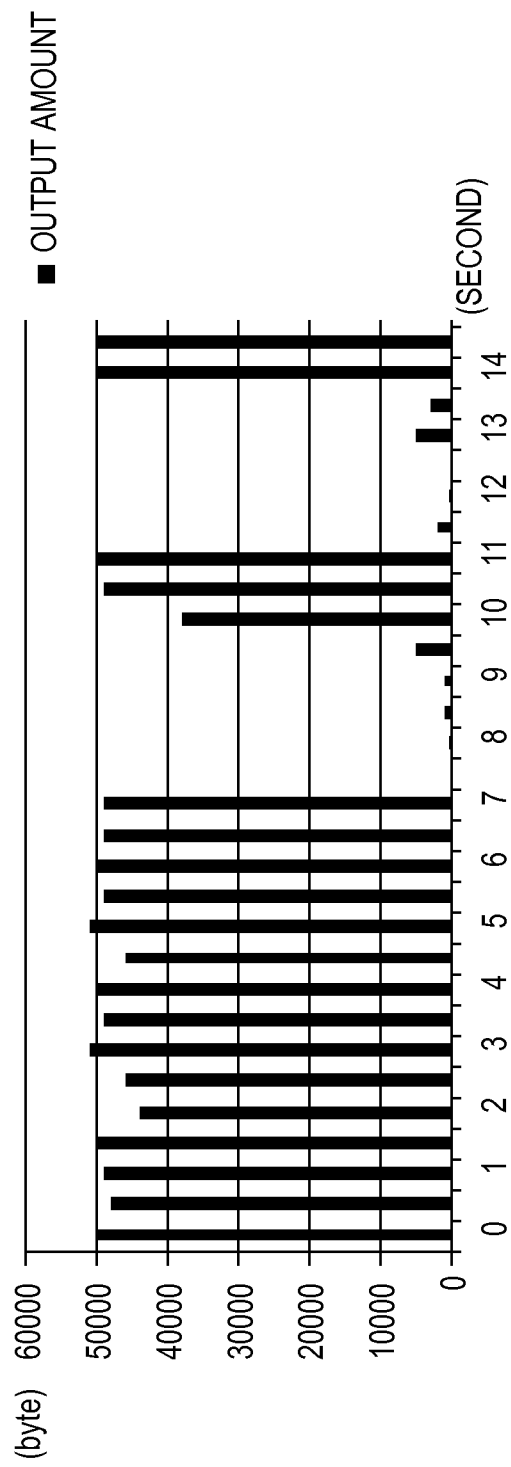
FIG. 3 is a graph showing an example of the measurement result of an output data transmission amount.

FIG. 3 is a graph showing data which is measured in the output data transmission amount measurement unit 15. In FIG. 3, the ordinate represents the data amount (byte), and the abscissa represents the measurement time (second).

The output data transmission amount measurement unit 15 measures output data transmitted by the output data transmission unit 14 every unit time. In an example shown in FIG. 3, the unit time is set to 0.5 seconds, and the graph shows a data amount output every 0.5 seconds. The unit time is a preset value according to contents and an environment of processing.

In the first embodiment, an output amount of output data is measured every unit time, and if there is a great change in the output amount, abnormalities are detected as those of a system or format conversion processing. The system abnormality, for example, indicates a situation in which other application occupies shared resources, such as access to the memory 2, the CPU 1 and the HDD 3, on a system (the information processing apparatus) where the format conversion operates. The abnormality of format conversion processing, for example, indicates a situation in which format conversion or data output is not performed successfully due to a program problem, or the like.

[Format Conversion Processing]

Figure 4:
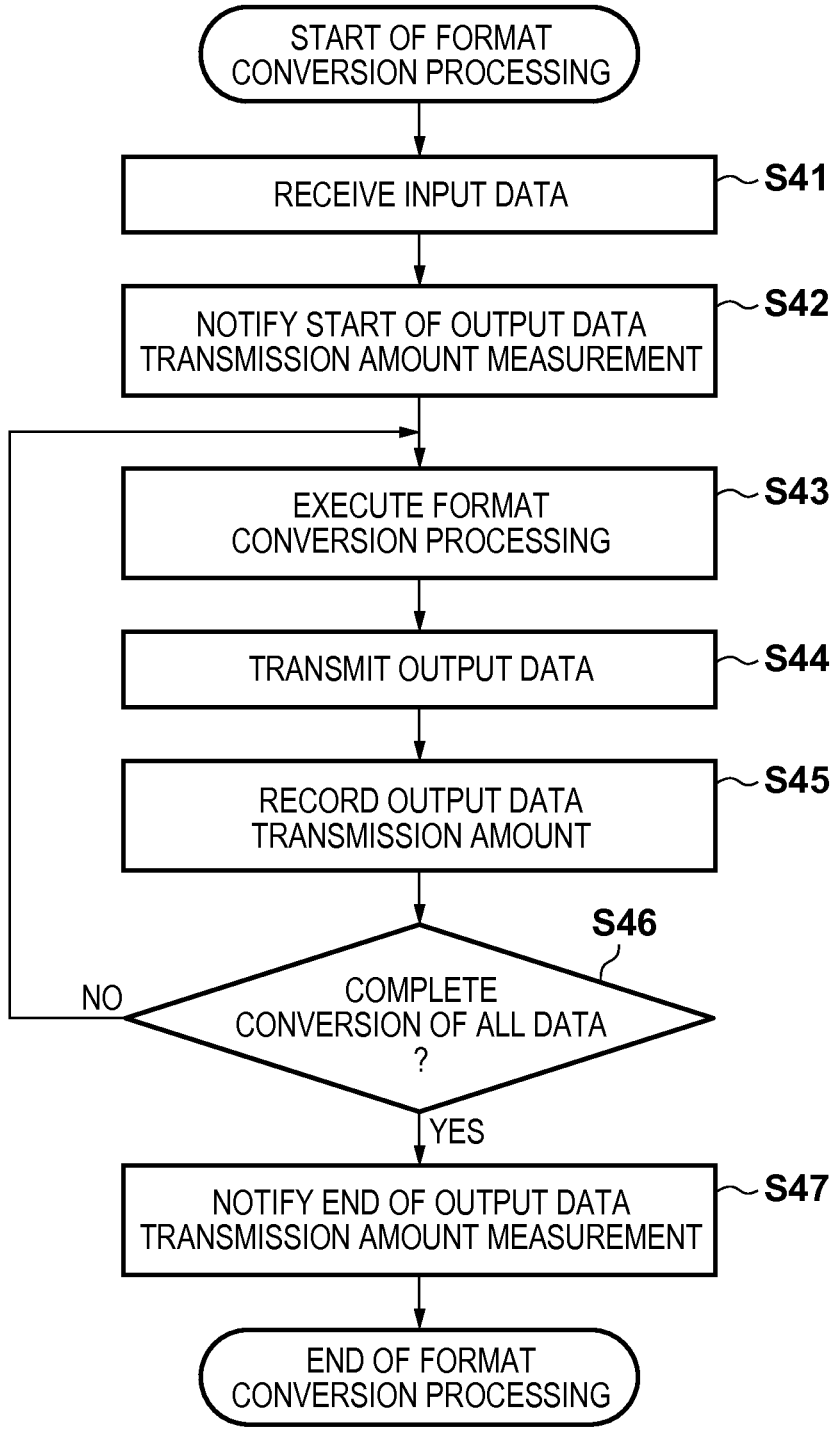
FIG. 4 is a flowchart of format conversion processing.

FIG. 4 is a flowchart of format conversion processing. This processing is executed in the format conversion unit 11 of the information processing apparatus 9, as described above.

The input data receiving unit 12 receives input data (step S41). Then, the format conversion processing unit 13 notifies the output data transmission amount measurement unit 15 of a start of output data transmission amount measurement (step S42). The output data transmission amount measurement unit 15 receives the measurement start notification and starts output data transmission amount measurement processing. After that, the format conversion processing unit 13 executes the format conversion processing for the input data received by the input data receiving unit 12 (step S43).

The output data transmission unit 14 sequentially transmits output data processed by the format conversion processing unit 13 in the order in which they have undergone processing (step S44). In the first embodiment, the output data transmission unit 14 transmits output data to the HDD 3 and saves it in the HDD 3. The output data transmission unit 14 stores transmitted output data transmission amount in the area reserved on the memory 2 together with information about the transmission time (step S45). Then, the format conversion processing unit 13 judges whether all the format conversion processing is complete (step S46). If the format conversion processing is not complete (NO in step S46), the format conversion processing unit 13 continues the format conversion processing. If the format conversion processing is complete (YES in step S46), the format conversion processing unit 13 notifies the output data transmission amount measurement unit 15 of an end of the output data transmission amount measurement (step S47). Upon receiving the measurement end notification, the output data transmission amount measurement unit 15 ends the output data transmission amount measurement.

[Output Data Transmission Amount Measurement Processing]

Figure 5:
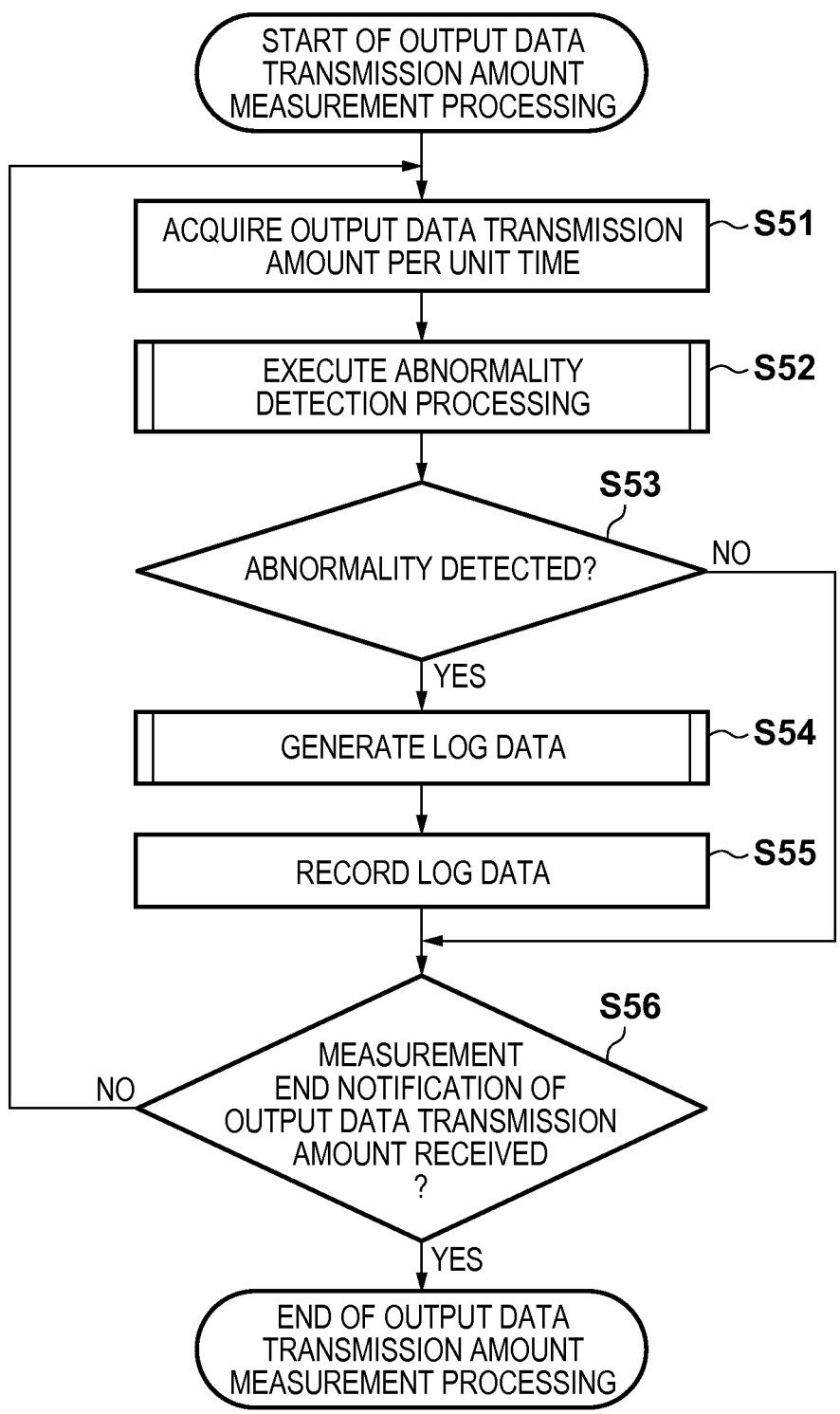
FIG. 5 is a flowchart of output data transmission amount measurement processing.

FIG. 5 is a flowchart of output data transmission amount measurement processing. The output data transmission amount measurement processing starts when the output data transmission amount measurement unit 15 receives the measurement start notification of the output data transmission amount from the format conversion processing unit 13. The output data transmission amount measurement processing is executed in a separate thread or process from that of format conversion, and is asynchronous to the format conversion processing. This processing is executed in the format conversion unit 11 of the information processing apparatus 9.

The output data transmission amount measurement unit 15 acquires an output data transmission amount per unit time based on the output data transmission amount, which is saved in the memory 2 by the output data transmission unit 14 and the information about the transmission time (step S51). This processing is executed every time the unit time elapses. The abnormality detection unit 16 executes abnormality detection processing based on the output data transmission amount acquired by the output data transmission amount measurement unit 15 (step S52). Details of this processing will be described later with reference to FIG. 6.

The log management unit 17 generates log data (step S54) when abnormalities are detected in the abnormality detection processing (YES in step S53). Details of this processing will be described later with reference to FIG. 8. After that, the log management unit 17 records the generated log data in the HDD 3 (step S55). Note that when no abnormalities are detected (NO in step S53), the generation and the record of the log data are not performed.

Subsequently, the output data transmission amount measurement unit 15 judges whether a measurement end notification of the output data transmission amount is received from the format conversion processing unit 13 (step S56). When not receiving a measurement end notification of the output data transmission amount (NO in step S56), the output data transmission amount measurement unit 15 acquires the output data transmission amount per unit time again (step S51). When receiving a measurement end notification of the output data transmission amount (YES in step S56), the output data transmission amount measurement unit 15 ends the output data transmission amount measurement processing.

[Abnormality Detection Processing]

Figure 6:
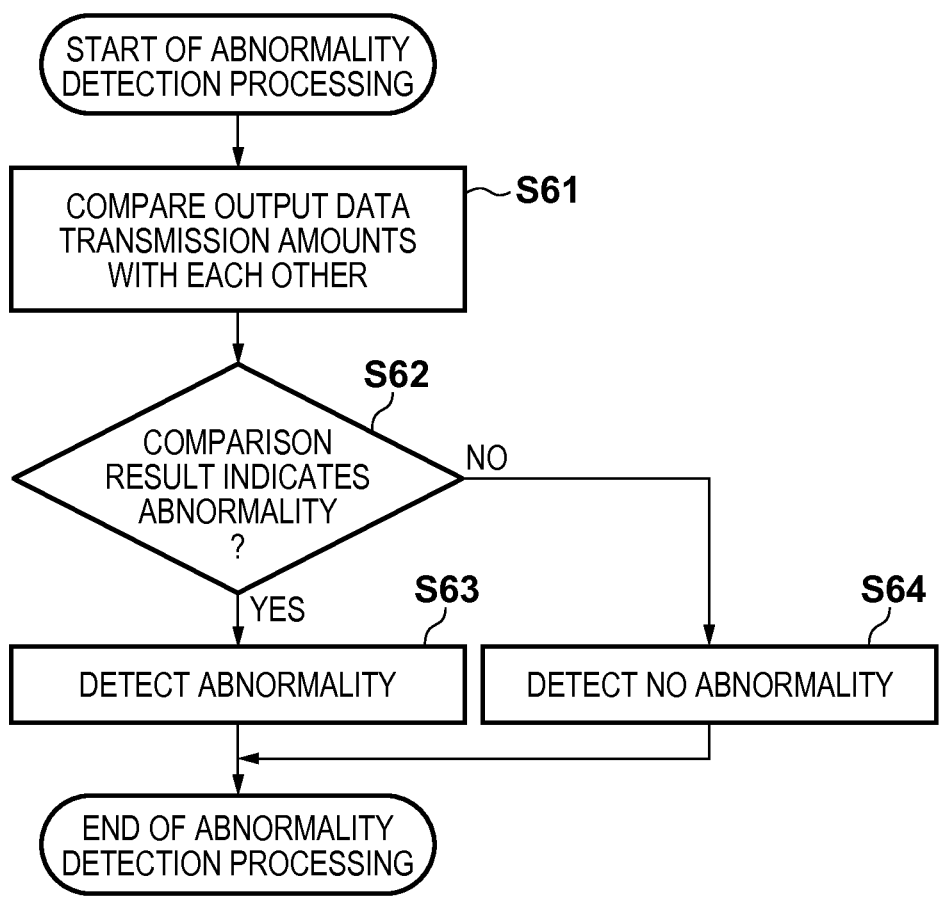
FIG. 6 is a flowchart of abnormality detection processing.

FIG. 6 is a flowchart of details of the abnormality detection processing (step S52) in FIG. 5. The abnormality detection unit 16 compares output data transmission amounts per continuous unit time with each other (step S61). Details of the comparison will be described with reference to FIG. 7. The abnormality detection unit 16 determines whether the comparison result indicates any abnormalities (step S62). When determining that the comparison result indicates abnormalities (YES in step S62), the abnormality detection unit 16 detects abnormalities (step S63). When determining that the comparison result indicates no abnormalities (NO in step S62), the abnormality detection unit 16 does not detect any abnormalities (step S64). Then, this processing sequence ends.

Figure 7:
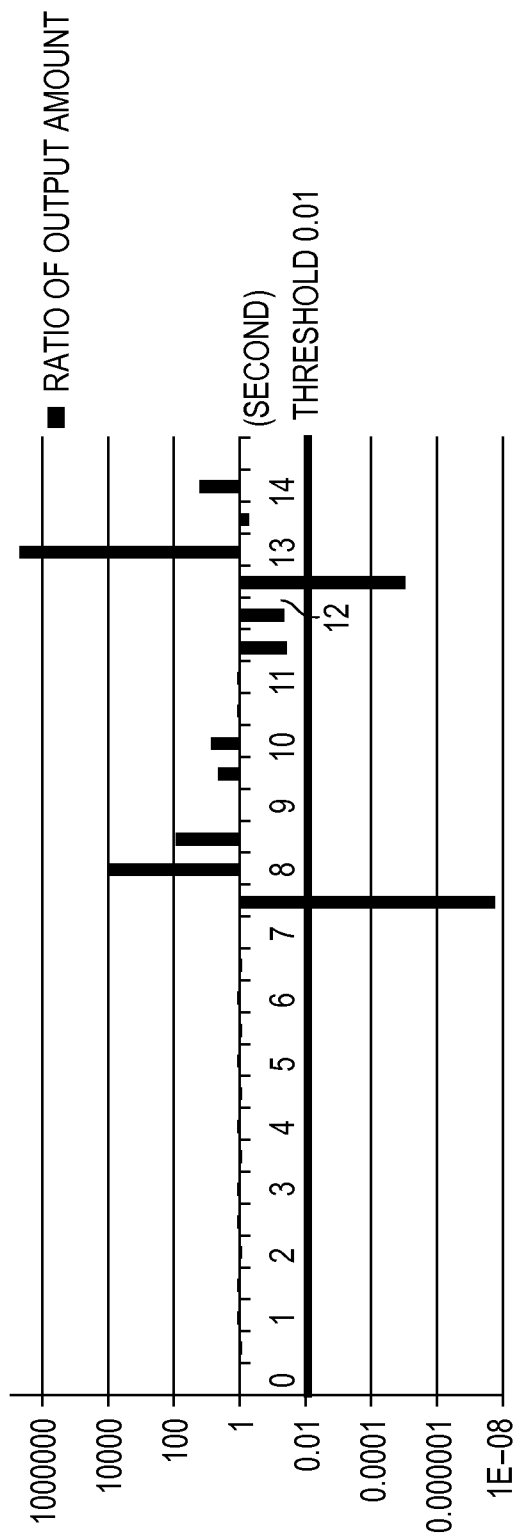
FIG. 7 is a graph for explaining an abnormality detection method.

The comparison of the output data transmission amounts performed in step S61 in FIG. 6 will be described with reference to FIG. 7. FIG. 7 is a graph showing the ratio of the output data transmission amount in the present unit time to that in the previous unit time for the data shown in FIG. 3, which is an example of data measured by the output data transmission amount measurement unit 15. In FIG. 7, the ordinate represents the output amount ratio, and the abscissa represents the measurement time (second). Here, a unit time of interest is referred to as the present unit time, and an immediately preceding unit time is referred to as the previous unit time.

When the unit time is 0.5 seconds, the ratio of the total output data transmission amount at one second (that is, total quantity of the output data transmission amount between 0.5 seconds and one second) to the total output data transmission amount at 0.5 seconds (that is, total quantity of the output data transmission amount between 0 second and 0.5 seconds). If the value of the ratio is small, it indicates that the output data transmission amount per unit time decreased from the previous unit time to the present unit time. The abnormality detection unit 16 detects abnormalities when the value of the ratio is equal to or smaller than a predetermined threshold.

In an example of FIG. 7, the threshold is set to 0.01. Therefore, abnormalities are detected at 7.5 seconds and 12.5 seconds when the value is smaller than 0.01. Regarding the comparison of the output data transmission amounts, the abnormality detection unit 16 may apply a moving average to the data measured by the output data transmission amount measurement unit 15 and determine abnormalities based on the value after the moving average is applied.

[Log Data Generation Processing]

Figure 8:
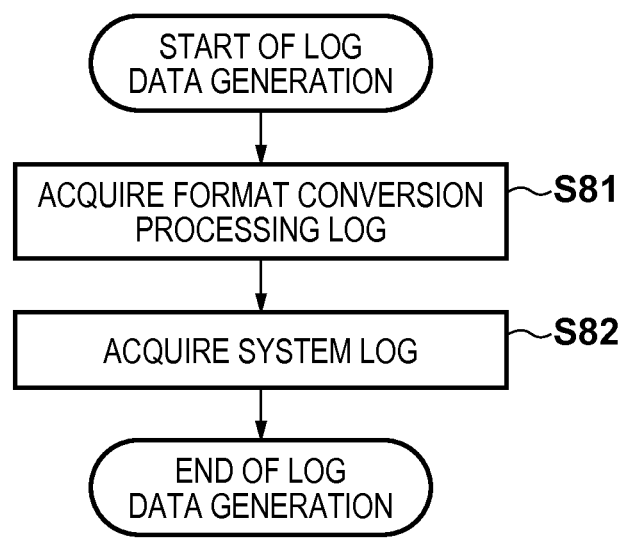
FIG. 8 is a flowchart of log data generation.

FIG. 8 is a flowchart showing details of the log data generation (step S54) in FIG. 5. The log management unit 17 acquires a format conversion processing log recorded on the memory 2 by the format conversion processing unit 13 (step S81). Details of contents of the format conversion processing log will be described with reference to FIG. 9A. The format conversion processing unit 13 outputs a format conversion log for executing the format conversion processing in the area on the memory 2, which is reserved by the log management unit 17 in advance. A memory size reserved on the memory 2 is predetermined. Thus, in case a given memory size is exceeded when recording a new log, it is recorded while erasing an old log so as not to exceed the memory size. Then, the log management unit 17 acquires a system log(step S82). Details of contents of the system log will be described with reference to FIG. 9B.

FIGS. 9A and 9B are tables showing examples of the format conversion log and the system log created by the log management unit 17. The format conversion log shown in FIG. 9A is the log where the format conversion processing unit 13 describes contents of the format conversion processing such as the progress of the processing and parameters when executing the processing. The system log shown in FIG. 9B is the log on the information processing apparatus 9 where the format conversion unit 11 operates, and includes a description of a resource state in the information processing apparatus 9 such as the use statuses of the memory 2 and the CPU 1, and the operation statuses of other applications on the same apparatus.

The processing status of the format conversion unit 11 upon the occurrence of an abnormality can be acquired from the format conversion log. Furthermore, the system statuses other than that of the format conversion unit 11 can be acquired from the system log. This allows the user to easily specify whether the abnormality is caused by the format conversion unit 11 or the system.

The abnormality detection method of the format conversion processing in the first embodiment notifies the start and the end of the output data transmission amount measurement, and measures the output data transmission amount per unit time only from the start to the end of the processing. Then, abnormalities are detected based on the change in the output data transmission amount for each measured unit time. This enables an appropriate abnormality detection and suppression of a log occurrence due to unnecessary abnormality detection.

<Second Embodiment>

Among processing instructions (processing commands) included in input data, there is a command which results in an abrupt variation in output data transmission amount. For example, when a command for showing a special gradation pattern is input, a data amount output at a present unit time may increase abruptly as compared to a previous unit time. In addition, for example, when a command for rendering and outputting a very large image is input, the output data amount increases abruptly during the present unit time as compared to the previous unit time. When measuring the output data transmission amount for these processing commands, and applying abnormality detection processing according to the arrangement of the first embodiment, abnormalities are detected even if the processing is executed successfully. To prevent this, the arrangement taking such commands into consideration will be described in the second embodiment.

The commands described above (exceptional commands, hereinafter) are treated as an exception of abnormality detection. In the second embodiment, when processing the exceptional command, a format conversion processing unit 13 notifies an abnormality detection unit 16 of the exception, and determines that there are no abnormalities even if a change in the output data transmission amount is large. This makes it possible not to output a log during a period in which an abrupt variation in the output data transmission amount is predicted even though processing can be executed successfully, thus an overload of an HDD 3 due to an unnecessary log is prevented. Furthermore, only a log with an abnormality state can be output, and the log can be analyzed easily. A difference from the first embodiment will be described below.

[Format Conversion Processing]

Figure 10:
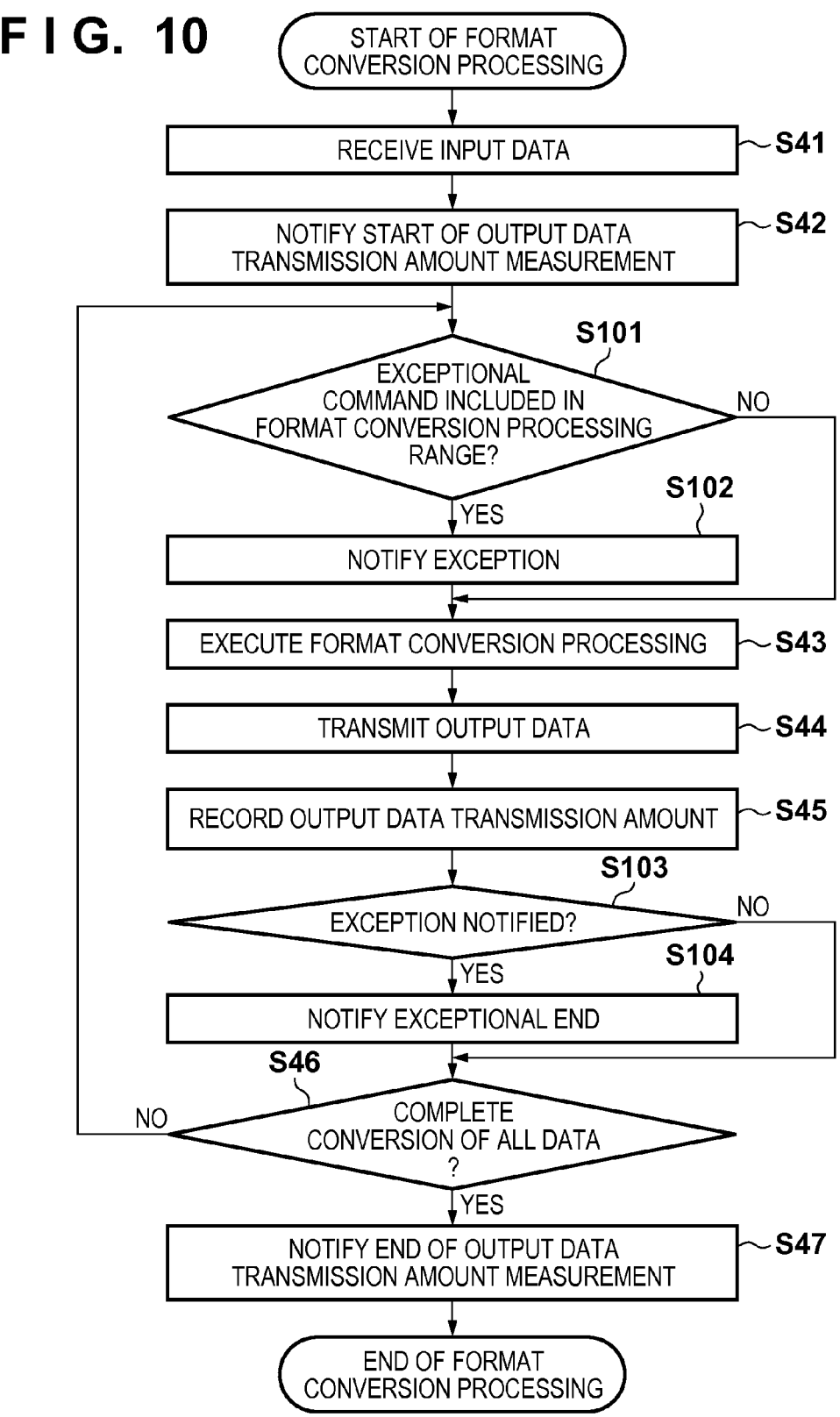
FIG. 10 is a flowchart of format conversion processing according to the second embodiment.

FIG. 10 is a flowchart of format conversion processing when the exception of the abnormality detection is included. Only a difference from FIG. 4 described in the first embodiment will be described below.

The format conversion processing unit 13 determines whether an exceptional command is included within a format conversion processing range (step S101) after a measurement notification of the output data transmission amount (step S42). The format conversion processing range is a processing target range within the input data where processing is executed in format conversion processing (step S43). A processing target command included in this range may be a single drawing command or a command for all the drawings included in pages.

The format conversion processing unit 13 holds a conditional table (122 in FIG. 12) of the exceptional command for which an abrupt variation in the output data transmission amount is predicted in advance. The format conversion processing unit 13 checks whether the command within the format conversion processing range matches a command defined in the conditional table of the exceptional command. Details will be described with reference to FIG. 11. When the processing target command is an exceptional command (YES in step S101), the format conversion processing unit 13 notifies the abnormality detection unit 16 of an exceptional start notification (step S102). The format conversion processing unit 13 determines whether the exceptional start notification is notified in step S102 (step S103) after recording the output data transmission amount (step S45). When the exceptional start notification is notified in step S102 (YES in step S103), the format conversion processing unit 13 notifies the abnormality detection unit 16 of an exceptional end notification (step S104). Otherwise, when the exceptional start notification is not notified in step S102 (NO in step S103), the process proceeds to step S46.

[Abnormality Detection Processing]

Figure 11:
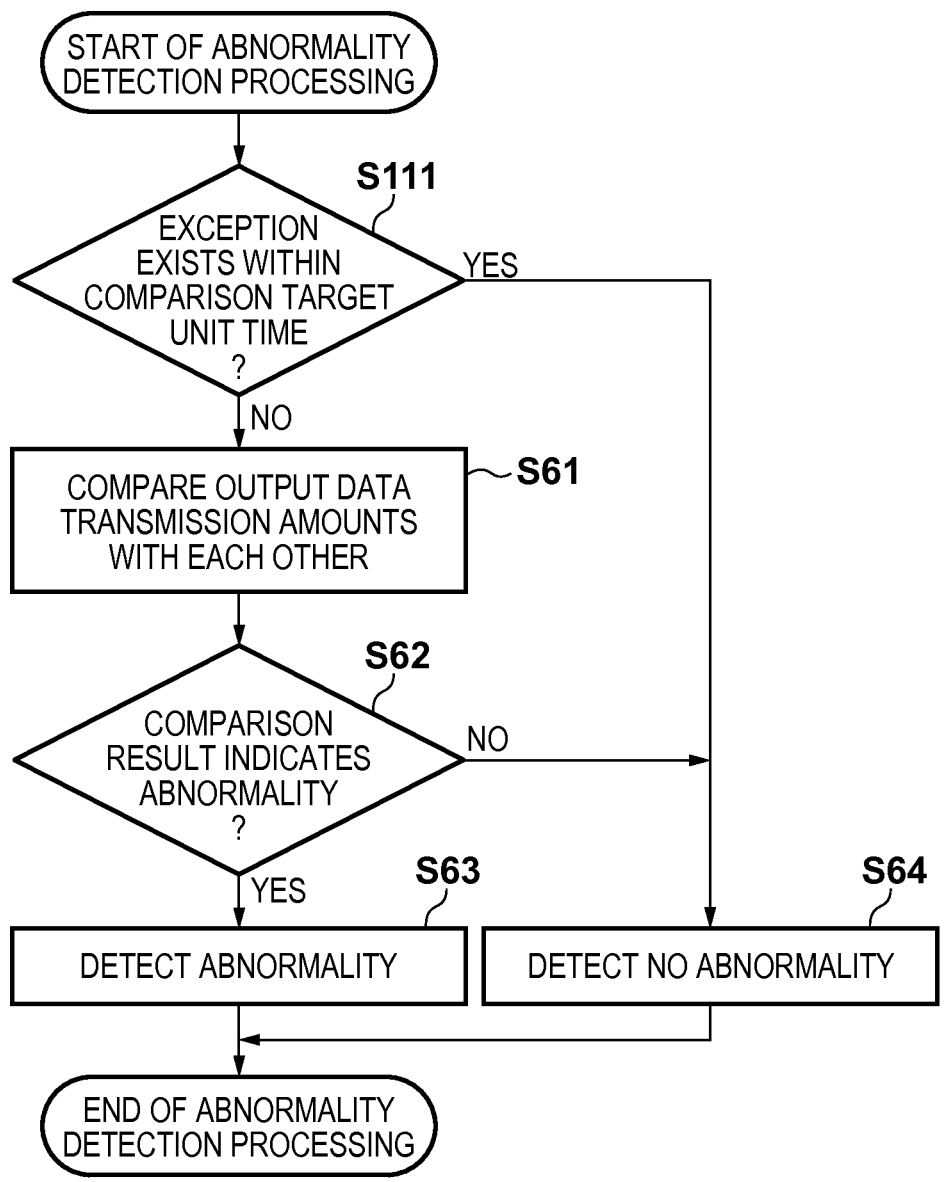
FIG. 11 is a flowchart of abnormality detection processing according to the second embodiment.

FIG. 11 is a flowchart of the abnormality detection processing when the exception of the abnormality detection is included. FIG. 11 corresponds to the process in step S52 in FIG. 5 described in the first embodiment. Only a difference from FIG. 6 described in the first embodiment will be described below.

The abnormality detection unit 16 determines whether a comparison target unit time includes a period between a time when the exceptional start notification is received and a time when the exceptional end notification is received. In other words, the abnormality detection unit 16 determines whether a time zone where the exceptional command from the exceptional start notification to the exceptional end notification is processed is included within the comparison target unit time (step S111). The comparison target unit time indicates the time durations of the present unit time and the previous unit time for comparison of the output data transmission amounts. When there is a time zone where an exceptional command is processed within this comparison target unit time (YES in step S111), the abnormality detection unit 16 does not detect any abnormalities.

[Exceptional Determination]

FIG. 12 is tables for explaining exceptional determination. FIG. 12 shows examples of the drawing command of the input data (121) and the conditional table of the exceptional command (122). A command of an electronic document as the input data describes a line, an image, gradation, and the like to be drawn together with a parameter. The format conversion processing unit 13 sequentially interprets the command of the input data to perform a format conversion.

An exceptional command conditional table is a list of conditions for exceptional commands. For example, an image or the like having a predetermined special gradation pattern, or a predetermined size or more is an exceptional command condition. A condition defined in the exceptional command condition table may be predefined or configured so that the user can define it.

In the second embodiment, when processing a command for which an abrupt variation in the output data transmission amount is predicted, the abnormality detection unit 16 is notified of the exception, and no abnormalities are determined even if the change in the output data transmission amount is large. This makes it possible not to output a log at a time when an abrupt variation in the output data transmission amount is predicted even though the processing can be executed successfully, and an overload of the HDD 3 due to unnecessary logs is prevented. Furthermore, only a log with an abnormality state can be output, and log analysis is easy.

<Third Embodiment>

In contrast to the first embodiment, processing of not detecting an abnormality within a predetermined time from previous abnormality detection as an abnormality is included in the third embodiment. When an increase/decrease of the output data transmission amount is extreme, abnormalities may be detected several times in a short period of time. In this case, the cause is likely to be the same because the abnormalities occurred in a short period of time. However, outputting logs as many times as the number of abnormality detection results in an overload of an HDD 3.

To prevent this, logs are not output for abnormalities within the predetermined time (for example within 3 seconds) from the previous abnormality detection. This processing can prevent the overload of the HDD 3 due to an unnecessary log. Furthermore, logs can be analyzed easily by refraining from outputting logs considered to have the same cause. Only a difference from the first embodiment will be described below.

[Abnormality Detection Processing]

Figure 13:
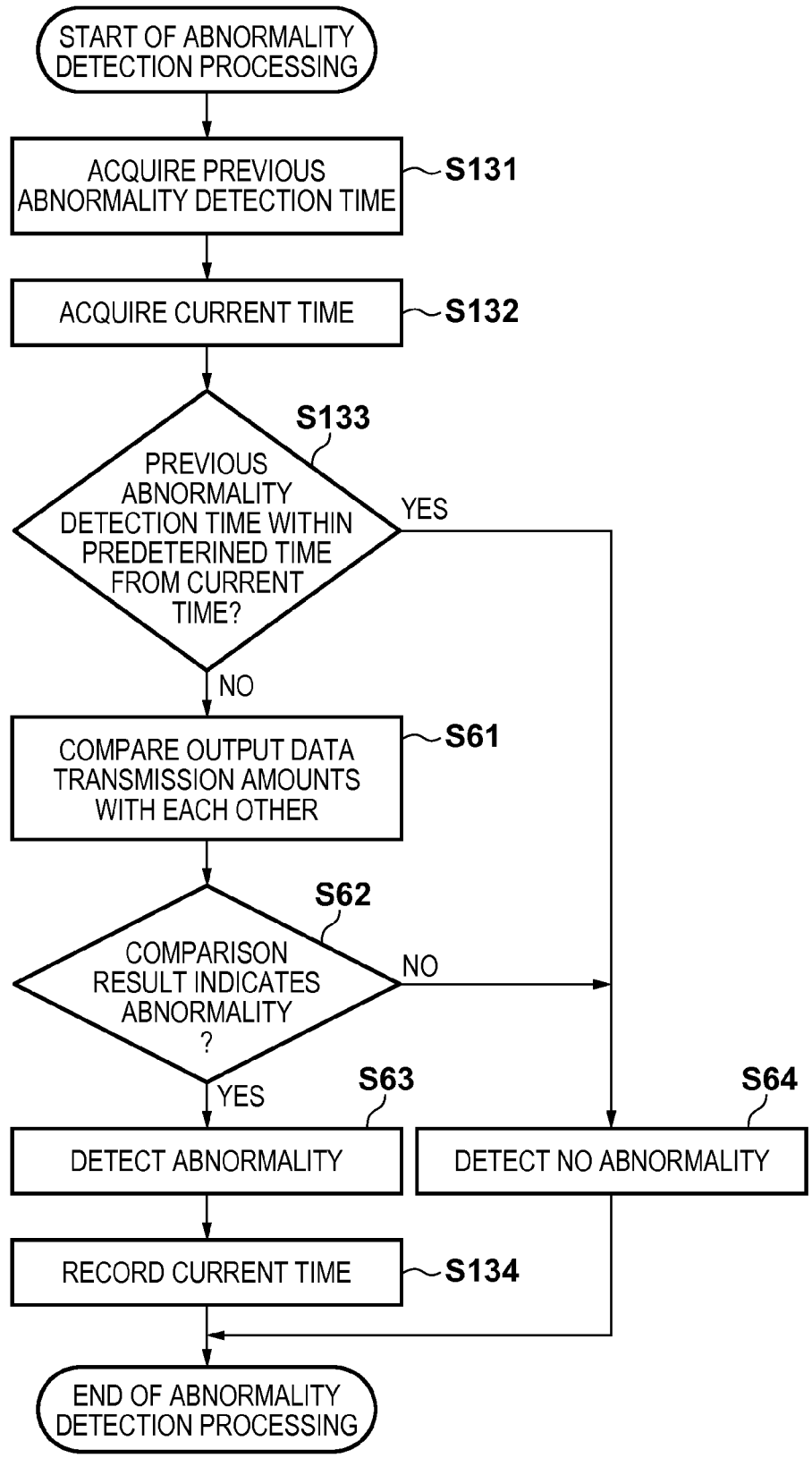
FIG. 13 is a flowchart of abnormality detection processing according to the third embodiment.

FIG. 13 is a flowchart of abnormality detection processing which does not detect an abnormality within the predetermined time from the previous abnormality detection as an abnormality. FIG. 13 corresponds to the process in step S52 in FIG. 5 described in the first embodiment. Only a difference from FIG. 6 described in the first embodiment will be described below.

An abnormality detection unit 16 acquires a previous abnormality detection time stored within a memory 2 (step S131). Then, the abnormality detection unit 16 acquires the current time (step S132). The abnormality detection unit 16 determines whether or not the previous abnormality detection time is within the predetermined time from the current time (step S133). When the previous abnormality detection time is within the predetermined time (YES in step S133), the abnormality detection unit 16 does not detect any abnormalities. Otherwise, when detecting abnormalities (step S63), the abnormality detection unit 16 stores the current time in the memory 2 (step S134). In the third embodiment, the abnormality detection unit 16 does not detect an abnormality within the predetermined time from the previous abnormality detection as an abnormality. This processing can omit outputting logs generated in a short period of time and considered to have the same cause, and prevent the overload of the HDD 3 due to unnecessary logs. Furthermore, logs can be analyzed easily by refraining from outputting logs generated in a short period of time and considered to have the same cause. Note that the predetermined time used in the third embodiment may be predefined or configured so that the user can define it.

<Fourth Embodiment>

In contrast to the first embodiment, processing of determining an abnormality from the relationship between an input data total reception amount and an output data total transmission amount is included in the fourth embodiment. When the output data total transmission amount is extremely large or small as compared to the input data total reception amount, there may be some abnormalities in format conversion processing. In this case, abnormality notification processing is executed. This makes it possible to detect an abnormal behavior of the format conversion processing. A difference from the first embodiment will be described below.

[Format Conversion Processing]

Figure 14:
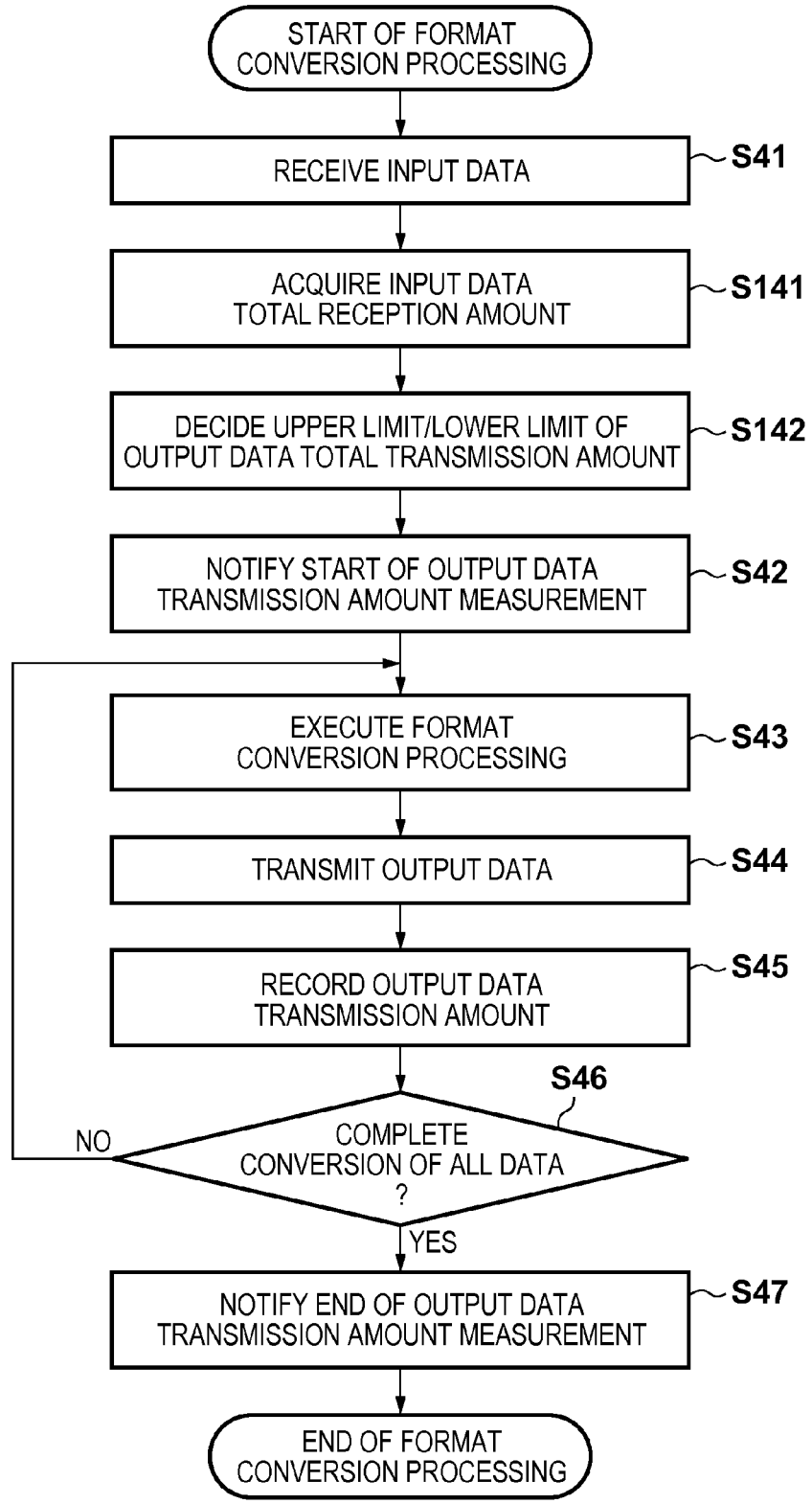
FIG. 14 is a flowchart of format conversion processing according to the fourth embodiment.

FIG. 14 is a flowchart of format conversion processing when determining an abnormality from the relationship between the input data total reception amount and the output data total transmission amount. Only a difference from FIG. 4 described in the first embodiment will be described below.

A format conversion processing unit 13 acquires the input data total reception amount (step S141). The input data total reception amount is the total amount of the input data received in input data reception processing (step S41) for present format conversion processing. The format conversion processing unit 13 decides an upper limit and a lower limit of the output data total transmission amount based on the input data total reception amount (step S142). The format conversion processing unit 13 holds the ratios of the upper limit and the lower limit of the output data total transmission amount to the predetermined input data total reception amount. For example, when the ratio of the upper limit of the output data total transmission amount to the input data total reception amount is 100, a value obtained by multiplying the input data total reception amount by 100 is the upper limit of the output data total transmission amount. Furthermore, when the ratio of the lower limit of the output data total transmission amount to the input data total reception amount is 0.01, a value obtained by multiplying the input data total reception amount by 0.01 is the lower limit of the output data total transmission amount.

[Output Data Transmission Amount Measurement Processing]

Figure 15:
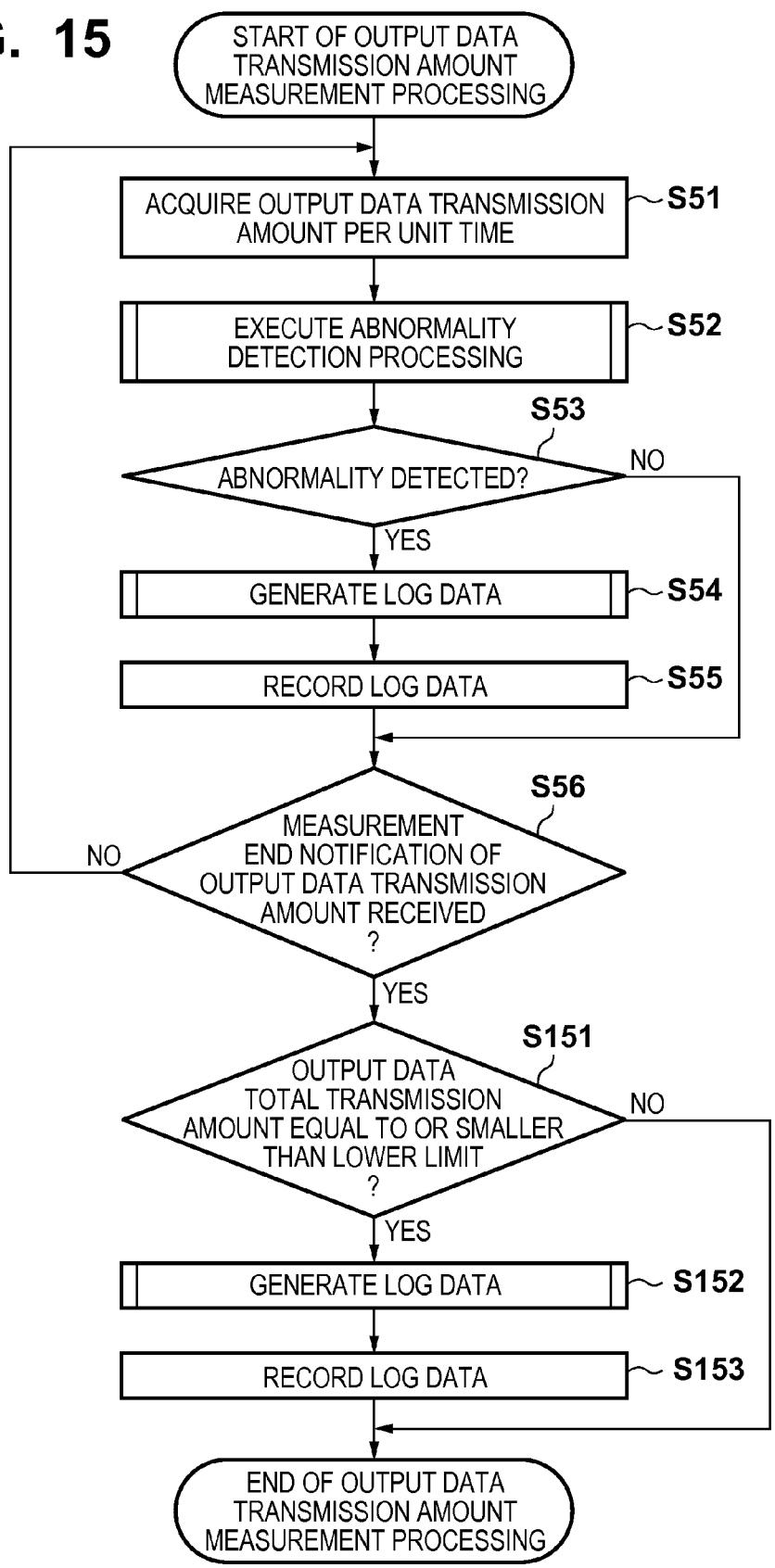
FIG. 15 is a flowchart of output data transmission amount measurement processing according to the fourth embodiment.

FIG. 15 is a flowchart of output data transmission amount measurement processing when judging the abnormality from the relationship between the input data total reception amount and the output data total transmission amount. Only a difference from FIG. 5 described in the first embodiment will be described below.

When an output data transmission amount measurement unit 15 receives a measurement end notification of the output data transmission amount (YES in step S56), a log management unit 17 determines whether or not the output data total transmission amount is equal to or lower than the lower limit of the output data total transmission amount decided in the format conversion processing (step S151). When the output data total transmission amount is equal to or smaller than the lower limit (YES in step S151), the log management unit 17 generates log data (step S152). Then, the log management unit 17 records the generated log data (step S153). Note that the log data generation (step S152) is the same as the log data generation (step S54) described in the first embodiment. Also, the log data recording (step S153) is the same as the log data recording (step S55) described in the first embodiment.

[Abnormality Detection Processing]

Figure 16:
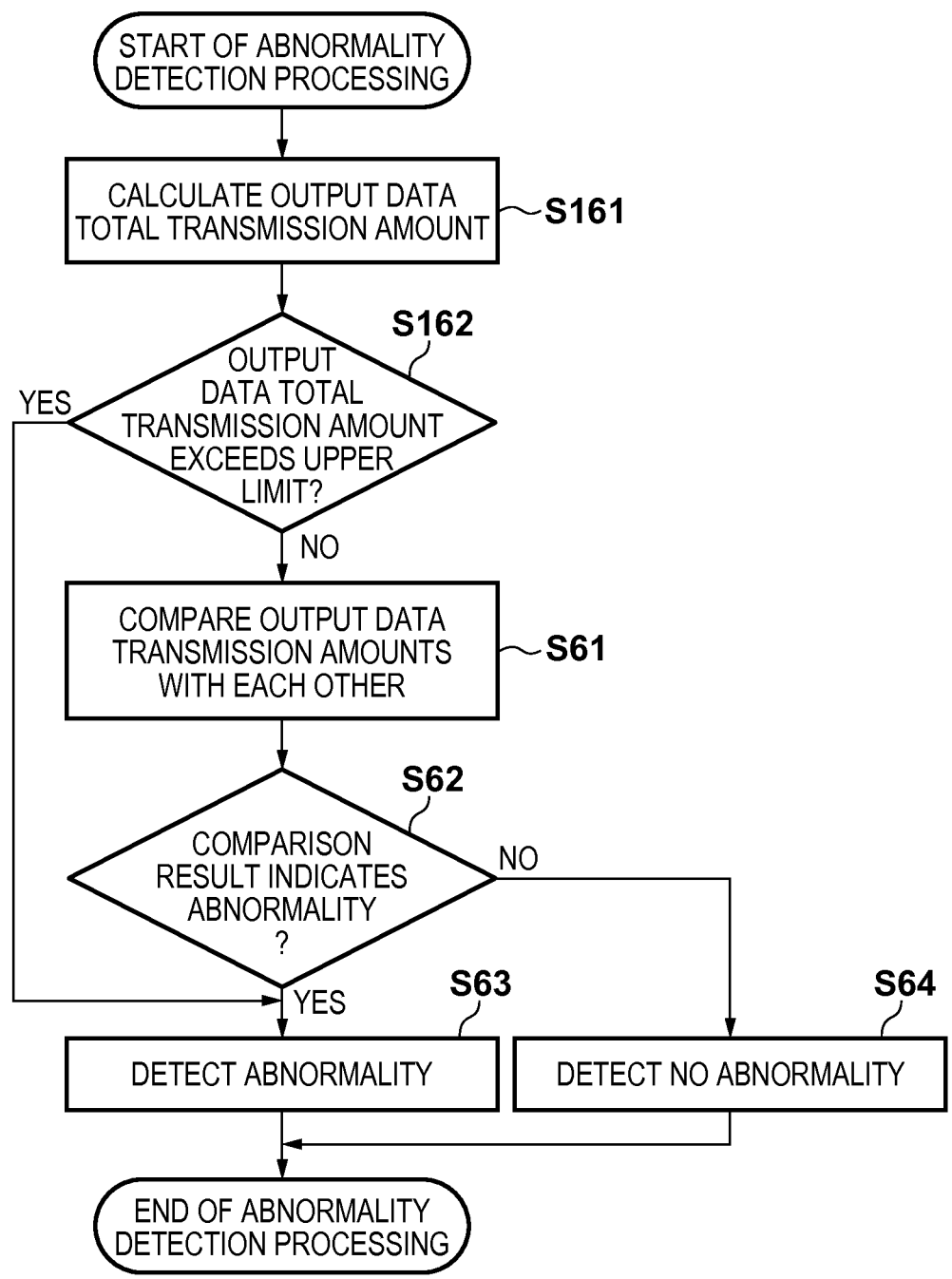
FIG. 16 is a flowchart of abnormality detection processing according to the fourth embodiment.

FIG. 16 is a flowchart of the abnormality detection processing when determining an abnormality from the relationship between the input data total reception amount and the output data total transmission amount. FIG. 16 corresponds to the process in step S52 in FIG. 15. Only a difference from FIG. 6 described in the first embodiment will be described below.

An abnormality detection unit 16 calculates the output data total transmission amount (step S161). The output data total transmission amount is a sum of the transmission amounts of output data saved by an output data transmission unit 14 in present format conversion processing. The abnormality detection unit 16 determines whether or not the output data transmission amount exceeds the upper limit of the output data (step S162). When the output data transmission amount exceeds the upper limit (YES in step S162), the abnormality detection unit 16 detects an abnormality (step S63).

In the fourth embodiment, when the output data total transmission amount is extremely large or small as compared to the input data total reception amount, abnormality notification processing is executed. This makes it possible to detect an abnormal behavior of the format conversion processing.

<Fifth Embodiment>

In the fifth embodiment, an abnormality detection method according to the present invention is applied to a filter pipe-line system. The filter pipe-line system is a processing method of connecting a plurality of detachable modules, and treats the modules as filters. In the filter pipe-line system, an output from a given filter is an input to a filter in a next stage.

That is, it is characterized in that the filter in the next stage can sequentially receive output data sequentially output by the given filter as an input, and start processing the received data as it is being received.

In the filter pipe-line system, an output from a given filter becomes an input to a filter in the next stage. Therefore, if an output from a filter in a previous stage is delayed, filter processing in succeeding stages will be delayed. As a result, when abnormalities are detected in all filters, the respective filters output logs, thus overloading an HDD 3. In the fifth embodiment, the overload of the HDD 3 caused by the logs output by the filters in the succeeding stages can be prevented by executing log output processing only in a filter where an abnormality was first detected. Furthermore, because a log is output only in a filter where an abnormality was first detected, log analysis easy. Only a difference from the second embodiment will be described blow.

[Software Configuration]
(Format Conversion Unit)

Figure 17:
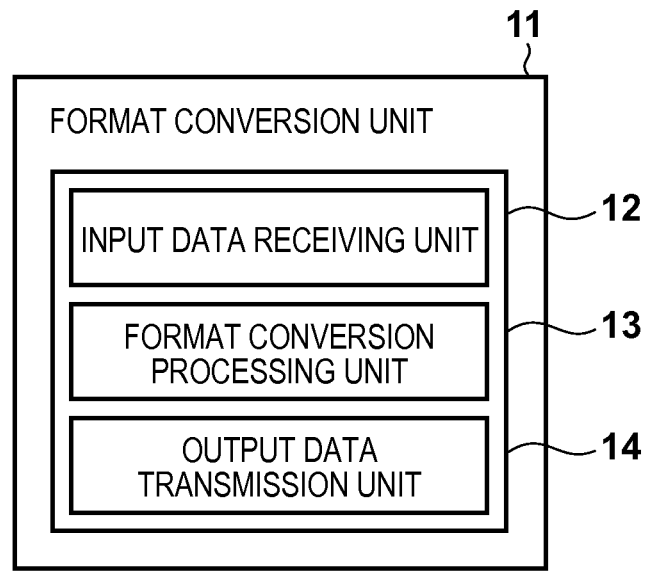
FIG. 17 is a block diagram showing an example of the arrangement of a format conversion unit according to the fifth embodiment.

FIG. 17 is a block diagram showing a format conversion unit 11 according to the fifth embodiment. The arrangement shown in FIG. 17 is obtained by removing the output data transmission amount measurement unit 15, the abnormality detection unit 16, and the log management unit 17 of the format conversion unit 11 in the first embodiment shown in FIG. 2. In the fifth embodiment, the removed units are located in the respective format conversion filters arranged within a format conversion processing unit 13 in the fifth embodiment.

(Format Conversion Processing Unit)

Figure 18:
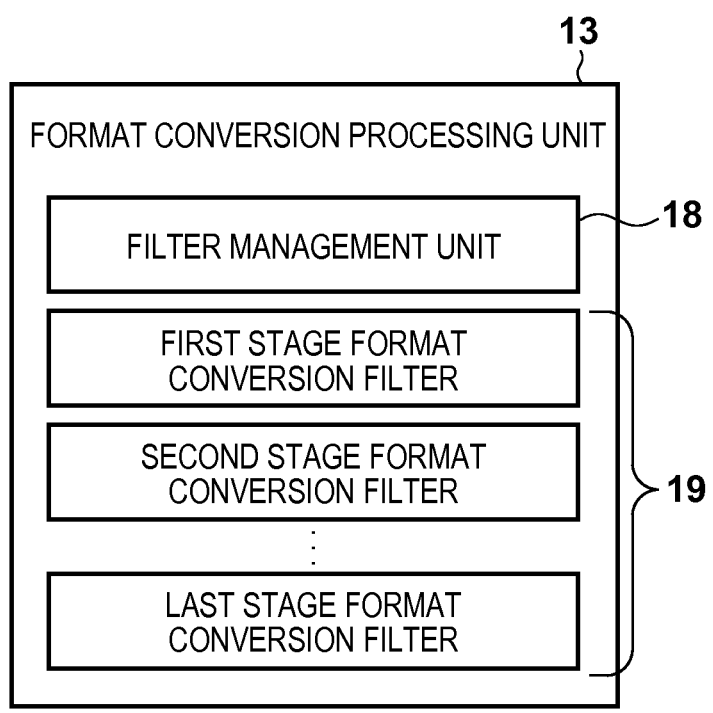
FIG. 18 is a block diagram showing an example of the arrangement of a format conversion processing unit according to the fifth embodiment.

FIG. 18 is a block diagram showing the format conversion processing unit 13 according to the fifth embodiment. The format conversion processing unit 13 has a filter management unit 18 and a plurality of format conversion filters 19. The format conversion filters 19 have a multi-stage structure. The filter management unit 18 manages control of the filter order and data input/output.

(Format Conversion Filter)

Figure 19:
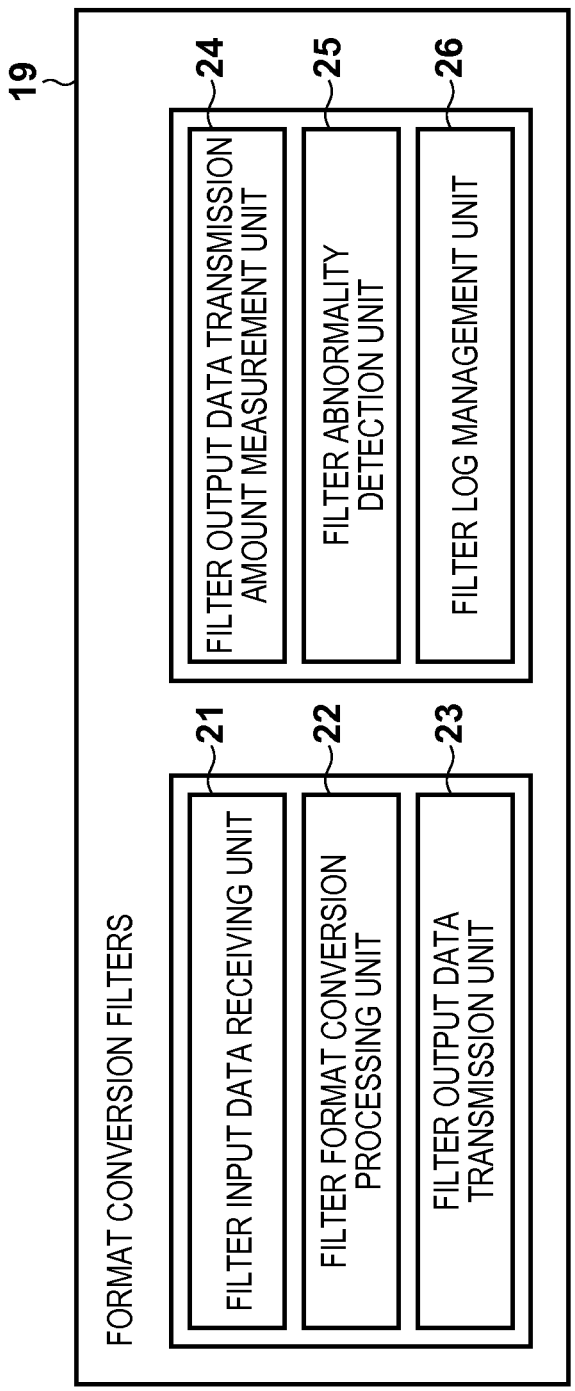
FIG. 19 is a block diagram showing an example of the arrangement of format conversion filters according to the fifth embodiment.

FIG. 19 is a block diagram showing the format conversion filters 19 arranged within the format conversion processing unit 13. The arrangement shown in FIG. 19 is obtained by arranging a part of the arrangement of the format conversion unit 11 in the first embodiment within the respective format conversion filters. A filter input data receiving unit 21 receives, from the filter management unit 18, the output data from the immediately preceding stage as the input data.

In the case of the format conversion filter in the first stage, data received by the input data receiving unit 12 is received through the filter management unit 18. A filter format conversion processing unit 22 executes format conversion processing in the filter. A filter output data transmission unit 23 sequentially transmits output data processed by the filter format conversion processing unit 22 to the format conversion filter in the next stage.

In the case of the format conversion filter in the last stage, output data is sequentially transmitted to an output data transmission unit 14 through the filter management unit 18. A filter output data transmission amount measurement unit 24 measures the data transmitted by the filter output data transmission unit 23 every unit time. A filter abnormality detection unit 25 detects abnormalities based on the value of the output data transmission amount measured by the filter output data transmission amount measurement unit 24. When the filter abnormality detection unit 25 detects an abnormality, a filter log management unit 26 outputs a log.

[Abnormality Detection Processing]

Figure 20:
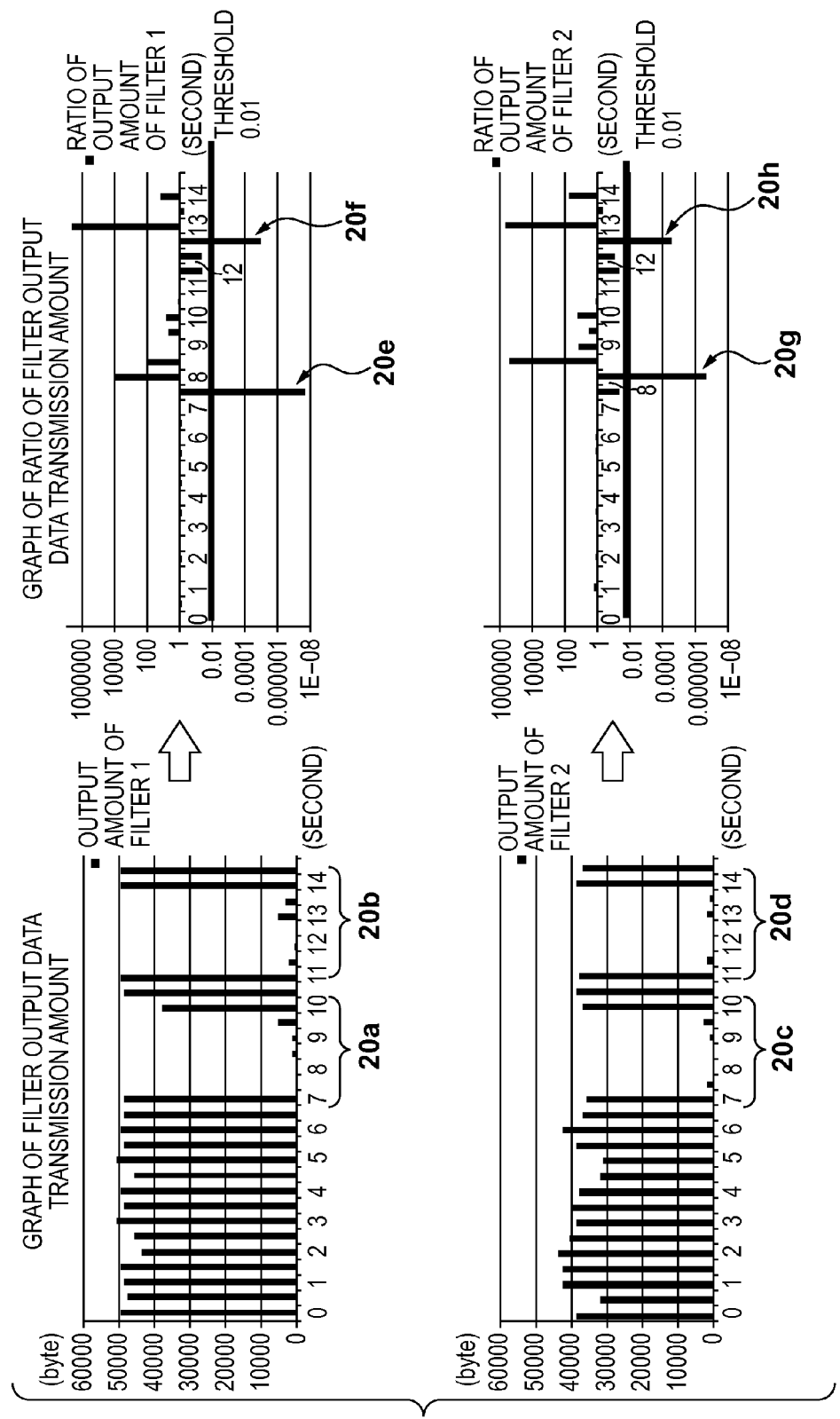
FIG. 20 is graphs for explaining the input/output relationship between multi-stage filters.

The abnormality detection by the format conversion filters 19 will be described with reference to FIG. 20. If output data transmission stagnates due to abnormalities or exceptional command processing in a certain filter, an input stagnates in all succeeding filters, and the output data transmission stagnates. When detecting abnormalities in all the filters, the HDD 3 becomes overloaded. Therefore, it is desirable to output a log only in a filter where an abnormality was first detected. The format conversion filters are simply referred to as filters here, and they are processed in the order of filter 1 and filter 2. FIG. 20 shows graphs of the output data transmission amount per unit time of filter 1 and filter 2, and graphs of the ratio of the output data transmission amount in the present unit time to that in the previous unit time. The configuration of the graphs shown in FIG. 20 is the same as those in FIGS. 3 and 7 described in the first embodiment.

Output stagnation due to the occurrence of an abnormality (20*a*) and output stagnation due to exceptional command processing (20*b*) may occur in filter 1. In this case, the output also stagnates in filter 2, which receives the output from filter 1 as an input. Output stagnation due to the occurrence of an abnormality in filter 1 (20*c*) and output stagnation due to exceptional command processing of filter 1 (20*d*) correspond to this situation.

In filter 1, when the ratio of the output data transmission amount in the present unit time to that in the previous unit time is equal to or smaller than a threshold, an abnormality is detected (20*e*) unless under the exceptional command processing. On the other hand, no abnormality is detected under the exceptional command processing (20*f*).

In filter 2, the ratio of the output data transmission amount in the present unit time to that in the previous unit time may become equal to or smaller than the threshold due to the occurrence of an abnormality or the exceptional command processing in filter 1. As shown in the example of FIG. 20, a state (20*g*) in which the ratio of the output data transmission amount in the present unit time to that in the previous unit time becomes equal to or smaller than the threshold due to the occurrence of an abnormality in filter 1 (20*a*) is detected. Also, a state (20*h*) in which the ratio becomes equal to or smaller than the threshold due to the occurrence of an abnormality in filter 1 (20*b*) is detected. In these cases, since a change in the output data transmission amount of filter 2 is caused by the influence of filter 1, it is not an abnormality in filter 2. Therefore, in the present invention, abnormalities due to the occurrence of an abnormality and the exceptional command processing in the previous filter are not detected as abnormalities in the subsequent filter.

[Format Conversion Processing]

Figure 21:
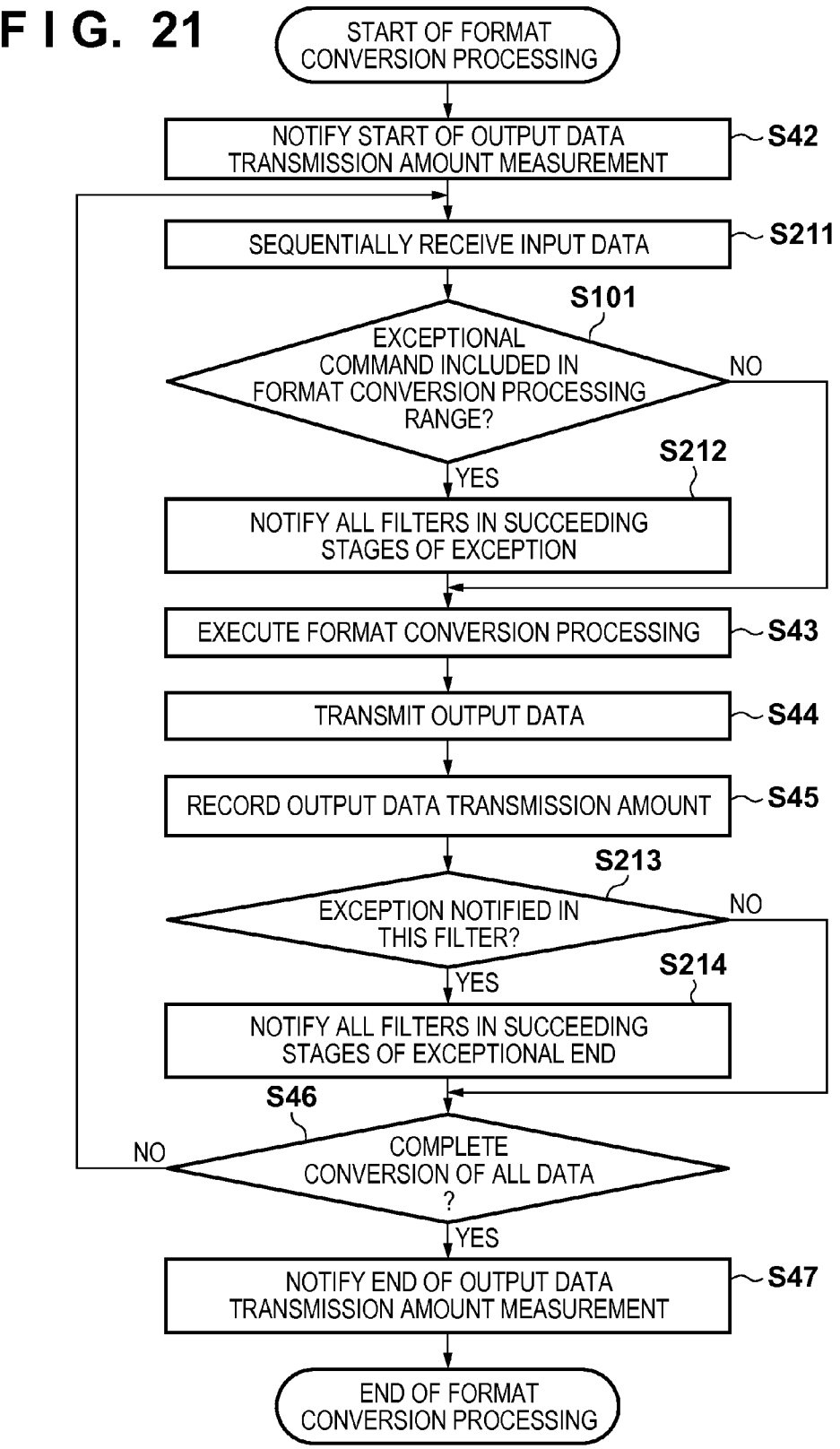
FIG. 21 is a flowchart of format conversion processing according to the fifth embodiment.

FIG. 21 is a flowchart of the format conversion filters 19 according to the fifth embodiment. In the fifth embodiment, respective format conversion filters execute the format conversion processing (FIG. 10) in the second embodiment. Only a difference from FIG. 10 described in the second embodiment will be described. The format conversion filters 19 sequentially receive the output of the format conversion filters in the immediately preceding stage as the input data (step S211). The format conversion filters 19 process data in the order they are received.

The format conversion filters 19 determine whether or not an exceptional command is included in a format conversion processing range (step S101). When an exceptional command is included in the format conversion processing range (YES in step S101), the filter format conversion processing unit 22 notifies the filter abnormality detection units 25 of the filters in all the succeeding stages of an exceptional start (step S212).

Furthermore, after recording the output data transmission amount (step S45), the format conversion filters 19 determine whether or not the self format conversion filter notified the format conversion filters in the succeeding stages of the exceptional start in step S212. When the exceptional start was notified (YES in step S213), the filter format conversion processing unit 22 notifies the filter abnormality detection units 25 of the format conversion filters in all the succeeding stages of an exceptional end (step S214).

[Filter Abnormality Detection Processing]

Figure 22:
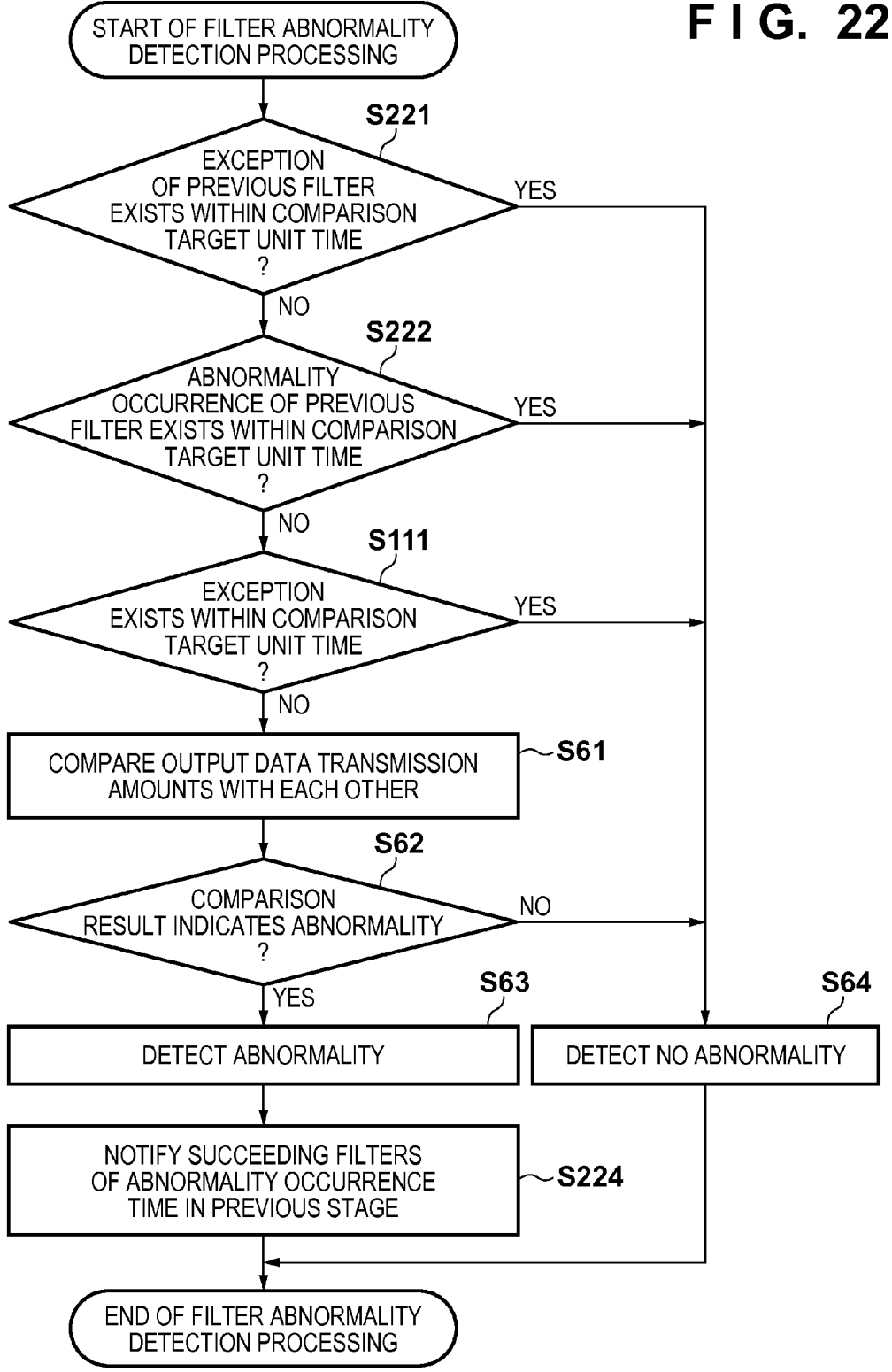
FIG. 22 is a flowchart of filter abnormality detection processing according to the fifth embodiment.

FIG. 22 is a flowchart of filter abnormality detection processing according to the fifth embodiment. Only a difference from FIG. 11 described in the second embodiment will be described.

Each filter abnormality detection unit 25 determines whether any of the format conversion filters in the preceding stages is processing an exceptional command within the comparison target unit time (step S221). In other words, the filter abnormality detection unit 25 determines whether or not an exceptional start notification has been received but an exceptional end notification has not been received from the format conversion filter in the previous stage. When any of the format conversion filters in the preceding stages is processing an the exceptional command (YES in step S221), the filter abnormality detection unit 25 does not detect any abnormalities within a unit time corresponding to that exception (step S64). Furthermore, the filter abnormality detection unit 25 determines whether an abnormality occurs in any of the format conversion filters in the preceding stages within the comparison target unit time (step S222). More specifically, the filter abnormality detection unit 25 determines whether an abnormality occurrence notification is received from any of the format conversion filters in the preceding stages. Upon determining the occurrence of an abnormality in any of the format conversion filters in the preceding stages within the comparison target unit time (YES in step S222) after receiving an abnormality occurrence notification, the filter abnormality detection unit 25 does not detect any abnormalities in a unit time zone corresponding to a time when the abnormality occurred (step S64).

In addition, when an abnormality other than that in the format conversion filter in the previous stage is detected (YES in step S62), the filter abnormality detection unit 25 notifies all the filters in the succeeding stages of the abnormality occurrence notification indicating that an abnormality occurs in the self format conversion filter and information about the time when the abnormality occurred (step S224). Note that base on the above result, the format conversion filter in the subsequent stage also determines whether an abnormality occurs in the format conversion filter in the previous stage within the comparison target unit time (step S222).

In the fifth embodiment, an abnormality is not detected when there is an abnormality or exceptional command processing is in progress in a filter in a stage before the previous stage (one or a plurality of format conversion filters), and the output of a succeeding filter has stagnated by that influence. By causing only the filter in a preceding stage, which detected the abnormality, to output a log, the overload of the HDD 3 due to an unnecessary log output by the format conversion filters in the succeeding stages can be prevented. Moreover, only the filter in a preceding stage outputs a log, and log analysis is easy.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-271779, filed Dec. 12, 2012, which is hereby incorporated by reference herein in its entirety.

What is claimed is:

1. An information processing apparatus comprising:
a processing unit configured to perform a predetermined process on input data, and to output the input data on which the predetermined process has been performed;
a specifying unit configured to specify a period, based on a start and an end of the predetermined process performed by the processing unit;
a measurement unit configured to measure a data size of the output data output from the processing unit per unit time;
a determination unit configured to determine whether the measured data size in the specified period satisfies a specific condition;
an output unit configured to generate an abnormality detection log associated with the predetermined process performed by the processing unit if the determination unit determines that the specific condition is satisfied and to output the generated log; and
a first module and a second module forming a multi-stage structure where output data of the first module becomes input data of the second module, wherein
each of the first module and the second module includes the processing unit, the specifying unit, the measurement unit, the determination unit, and the output unit,
the determination unit of the second module makes the determination based on a result of the determination by the determination unit of the first module, and
if an exceptional command is included in the input data input into the processing unit of the first module, the determination unit of the second module does not detect, as an abnormality, a change caused by the exceptional command in the data size of the output data output from the processing unit of the second module,
wherein at least one of processing unit, the specifying unit, the measurement unit, the determination unit, the output unit, the first module, and the second module is implemented using a CPU.

2. The information processing apparatus according to claim 1, wherein
the measurement unit measures a data size of the output data output from the processing unit for a current unit time and a data size of the output data output from the processing unit for a previous unit time, and
the determination unit determines that the measured data size in the specified period satisfies the specific condition if a ratio of the data size measured for the current unit time divided by the data size measured for the previous unit time is equal to or smaller than a predetermined threshold.

3. The information processing apparatus according to claim 1, wherein the determination unit does not make the determination until a certain period of time elapses after determining that the specific condition is satisfied.

4. The information processing apparatus according to claim 1, wherein the determination unit does not make the determination for the measured data size corresponding to an exceptional command included in the input data.

5. The information processing apparatus according to claim 1, further comprising a setting unit configured to set, based on a total amount of a data size of the input data, an upper limit and a lower limit,
wherein the determination unit determines that the measured data size in the specified period satisfies the specific condition if a total amount of a data size of the output data output from the processing unit for a current time is larger than the set upper limit or equal to or smaller than the set lower limit.

6. The information processing apparatus according to claim 1, wherein the log includes a log showing contents regarding to the predetermined process and a log showing a state of resources included in the information processing apparatus.

7. The information processing apparatus according to claim 1, wherein the determination unit of the first module notifies the second module that the specific condition is satisfied if the determination unit of the first module determines that the specific condition is satisfied.

8. The information processing apparatus according to claim 1, wherein, if the exceptional command is included in the input data input into the processing unit of the first module, the first module notifies the second module of processing of the exceptional command.

9. An information processing method comprising:
performing a predetermined process on input data;
outputting the input data on which the predetermined process has been performed;
specifying a period based on a start and an end of the predetermined process;
measuring a data size of the output data per unit time;
determining whether the measured data size in the specified period satisfies a specific condition;
generating an abnormality detection log associated with the predetermined process performed on the input data if it is determined that the specific condition is satisfied;
outputting the generated log; and
forming a multi-stage structure from a first module and a second module where output data of the first module becomes input data of the second module, wherein
each of the first module and the second module is configured to execute the performing step, the outputting the input data step, the specifying step, the measuring step, the determining step, the generating step, and the outputting the generated log step,
the determining step of second module makes the determination based on a result of the determination in the determination step of the first module, and
if an exceptional command is included in the input data input in the processing step of the first module, the determining step of the second module does not detect, as an abnormality, a change caused by the exceptional command in the data size of the output data output from the processing step of the second module.

10. A non-transitory computer-readable medium storing a program that when executed causes a computer to perform an information processing method, the information processing method comprising:
performing a predetermined process on input data;
outputting the input data on which the predetermined process has been performed;
specifying a period based on a start and an end of the predetermined process;
measuring a data size of the output data per unit time;
determining whether the measured data size in the specified period satisfies a specific condition;
generating an abnormality detection log associated with the predetermined process performed on the input data if it is determined that the specific condition is satisfied; and
outputting the generated log; and
forming a multi-stage structure from a first module and a second module where output data of the first module becomes input data of the second module, wherein
each of the first module and the second module is configured to execute the performing step, the outputting the input data step, the specifying in step, the measuring step the determining step, the generating step, and the outputting the generated log step,
the determining step of second module makes the determination based on a result of the determination in the determination step of the first module, and
if an exceptional command is included in the input data input in the processing step of the first module, the determining step of the second module does not detect, as an abnormality, a change caused by the exceptional command in the data size of the output data output from the processing step of the second module.

* * * * *